US008236891B2

(12) United States Patent
Golombowski et al.

(10) Patent No.: US 8,236,891 B2
(45) Date of Patent: Aug. 7, 2012

(54) ADHESIVE USEFUL FOR INSTALLING VEHICLE WINDOWS PROVIDING RAPID DRIVE AWAY TIME

(75) Inventors: Dietmar Golombowski, Horgen (CH); Paul Rohrer, Herrliberg (CH)

(73) Assignee: Dow Global Technologies LLC, Midland, MI (US)

( * ) Notice: Subject to any disclaimer, the term of this patent is extended or adjusted under 35 U.S.C. 154(b) by 403 days.

(21) Appl. No.: 12/393,550

(22) Filed: Feb. 26, 2009

(65) Prior Publication Data
US 2010/0154969 A1 Jun. 24, 2010

Related U.S. Application Data

(60) Provisional application No. 61/140,241, filed on Dec. 23, 2008.

(51) Int. Cl.
*C08G 18/00* (2006.01)
*C08K 3/00* (2006.01)

(52) U.S. Cl. ........ 524/589; 524/296; 524/297; 524/445; 524/590; 524/871; 156/71; 156/330.9; 156/331.4

(58) Field of Classification Search .................. 524/589, 524/590, 871
See application file for complete search history.

(56) References Cited

U.S. PATENT DOCUMENTS

| | | |
|---|---|---|
| 3,707,521 A | 2/1972 | De Santis |
| 3,779,794 A | 12/1973 | De Santis |
| 3,895,093 A | 7/1975 | Wagner et al. |
| 4,345,053 A | 8/1982 | Rizk et al. |
| 4,374,237 A | 2/1983 | Berger et al. |
| 4,525,511 A | 6/1985 | Kirby et al. |
| 4,625,012 A | 11/1986 | Rizk |
| 4,687,533 A | 8/1987 | Rizk |
| 4,780,520 A | 10/1988 | Rizk et al. |
| 4,857,623 A | 8/1989 | Emmerling et al. |
| 4,910,255 A | 3/1990 | Wakabayashi |
| 4,910,279 A | 3/1990 | Gillis |
| 5,370,905 A | 12/1994 | Varga |
| 5,623,044 A | 4/1997 | Chiao |
| 5,741,383 A | 4/1998 | Kneisel |
| 5,852,137 A | 12/1998 | Hsieh |
| 5,922,809 A | 7/1999 | Bhat |
| 5,976,305 A | 11/1999 | Bhat et al. |
| 6,015,475 A | 1/2000 | Hsieh et al. |
| 6,262,296 B1 * | 7/2001 | Nomura et al. ............... 560/115 |
| 6,319,311 B1 | 11/2001 | Katz |
| 6,362,300 B1 | 3/2002 | Araki |
| 6,512,033 B1 | 1/2003 | Wu |
| 6,657,035 B1 | 12/2003 | Nakata et al. |
| 6,709,539 B2 | 3/2004 | Zhou |
| 6,828,643 B2 | 12/2004 | Fulcher |
| 6,884,904 B2 * | 4/2005 | Smith et al. ..................... 560/26 |
| 7,101,950 B2 | 9/2006 | Zhou et al. |
| 7,226,523 B2 | 6/2007 | Rosenberg et al. |
| 7,361,292 B2 | 4/2008 | Zhou |
| 2002/0100550 A1 | 8/2002 | Mahdi et al. |
| 2003/0070741 A1 | 4/2003 | Rosenberg et al. |
| 2004/0204539 A1 | 10/2004 | Schindler et al. |
| 2006/0096694 A1 * | 5/2006 | Zhou .............................. 156/99 |
| 2007/0083003 A1 | 4/2007 | Gupta |
| 2008/0149257 A1 | 6/2008 | Tribelhorn et al. |
| 2008/0289761 A1 | 11/2008 | Bosshard et al. |
| 2009/0114336 A1 | 5/2009 | Zhu |

FOREIGN PATENT DOCUMENTS

EP     2 062 926 A     5/2009

* cited by examiner

*Primary Examiner* — Vickey Nerangis
(74) *Attorney, Agent, or Firm* — Dobrusin & Thennisch PC

(57) ABSTRACT

In one embodiment, the invention is a composition comprising: a) one or more isocyanate functional polyether based prepolymers having a polydispersity of less than about 2.5 determined by Gel Permeation Chromatography at a Mp of >1000; b) one or more plasticizers in sufficient amount that the composition can be pumped and applied to a substrate at a temperature of −10° C., preferably in an amount of about 15 percent by weight or less; c) one or more fillers in sufficient amount such that the composition exhibits a press flow viscosity of about 8 grams per minute or more; d) one or more catalysts for the reaction of isocyanate moieties with isocyanate reactive groups; wherein the composition demonstrates 30 minutes after application a high speed impact of about 1.6 MPa or greater according to DIN EN 1465 high speed impact test.

20 Claims, No Drawings

ADHESIVE USEFUL FOR INSTALLING VEHICLE WINDOWS PROVIDING RAPID DRIVE AWAY TIME

CLAIM OF BENEFIT OF FILING DATE

The present application claims the benefit of the filing date of U.S. Application Ser. No. 61/140,241, filed Dec. 23, 2008, which is hereby incorporated by reference for all purposes.

FIELD OF INVENTION

The invention relates to a composition comprising an isocyanate functional prepolymer useful as an adhesive which is useful in bonding glass into vehicles and buildings. In another embodiment, the invention is a method of bonding two or more substrates together utilizing such composition, wherein such substrates may include glass, buildings and vehicles. In another embodiment, the invention is a method of replacing a window in a vehicle using the composition of the invention.

BACKGROUND OF INVENTION

Adhesive compositions are used to affix (bond) glass (windows) into buildings and vehicles, see Rizk, U.S. Pat. No. 4,780,520; Bhat, U.S. Pat. No. 5,976,305; Bhat, U.S. Pat. No. 5,922,809; Hsieh et al, U.S. Pat. No. 6,015,475; Zhou, U.S. Pat. No. 6,709,539; Rosenberg et. al., U.S. Pat. No. 7,226,523; Wu, U.S. Pat. No. 6,512,033; Zhou, U.S. Pat. No. 7,101,950; Zhou, U.S. Pat. No. 7,361,292; Nakata, et al., U.S. Pat. No. 6,657,035 and Bosshard et al., CA 2,564,992, all incorporated herein by reference. In automobile factories windows are installed using robots and computer controlled processing which facilitates the use of a variety of high performance adhesives, for instance nonconductive adhesives and high modulus adhesives. The speed of cure is not a significant issue because new vehicles are not driven at a significant distance for several days after window installation. Conversely, when a vehicle needs a window replaced, it is often performed in a remote location by an installer working from a vehicle. In this environment, speed of cure is important as the vehicle owner desires to drive the vehicle as soon as possible after installation on the window. Adhesives useful in replacing windows for vehicles which facilitate fast drive away times are known; see Bhat, U.S. Pat. No. 5,976,305; Zhou, U.S. Pat. No. 6,709,539 and Rosenberg et al., U.S. Pat. No. 7,226,523. The introduction of various high performance adhesive compositions used for installing windows in automobile factories presents a problem for replacement window installers. First, adhesives that meet all the varied performance requirements are not available in the market place. Second, it is difficult to formulate many high performance adhesive compositions to allow rapid drive away. Thus, a replacement window installer often has to carry a variety of adhesives so that the installer can match the adhesive to the properties of the original adhesive.

What is needed is a composition which is useful as an adhesive for bonding glass into a structure which may be formulated to exhibit a variety of high performance properties (such as high modulus and nonconductive nature), exhibits fast safe drive away times (fast strength development) when applied under a wide range of environmental conditions, does not require expensive ingredients and does not sag or string when applied.

SUMMARY OF INVENTION

In one embodiment, the invention is a composition comprising a) one or more isocyanate functional polyether based prepolymers having an average polydispersity of less than about 2.5 determined by Gel Permeation Chromatography at a Mp of >1000; b) one or more plasticizers in sufficient amount that the composition can be pumped and applied to a substrate at a temperature of −10° C., preferably in an amount of about 15 percent by weight or less; c) one or more fillers in sufficient amount such that the composition exhibits a press flow viscosity or about 8 grams per minute or more; and d) one or more catalysts for the reaction of isocyanate moieties with isocyanate reactive groups; wherein the composition demonstrates 30 minutes after application a high speed impact of about 1.6 MPa or greater according to DIN EN 1465 high speed impact test. Preferably, the adhesive exhibits, 30 minutes after application, a peak strength of about 1.6 MPa or greater and an energy uptake of about 2.5 J or greater in a high speed impact test at 4 m/s, more preferably after full cure the adhesive exhibits a strength of at least 3 MPa in a quasi-static lap shear test at 10 mm/min according to DIN EN 1465. In a preferred embodiment, the filler comprises one or more carbon blacks, one or more non-pigmented fillers, one or more calcium carbonates, one or more thixotropes or a combination thereof. In a preferred embodiment, the one or more carbon black compositions are present in an amount such that the composition has a resistivity of at least $10^{10}$ Ohm-cm. In another preferred embodiment, a combination of one or more fillers and one or more isocyanate functional polyester based prepolymers is present in a sufficient amount that the composition exhibits a press flow viscosity of about 8 grams per minute or more.

In another embodiment, the invention is a method of bonding two or more substrates together which comprises contacting the two or more substrates together with a composition according to this invention disposed along at least a portion of the area wherein the substrates are in contact.

In yet another embodiment, the invention is a method of replacing a window of a vehicle comprising: i) removing the window from the vehicle; ii) applying a composition according to the invention to a replacement window or to the flange of the vehicle adapted to hold the window into the vehicle; iii) contacting the flange of the vehicle and the replacement window with the composition disclosed disposed between the replacement window and the flange of the vehicle; and iv) allowing the adhesive to cure.

The composition of the invention is useful as an adhesive to bond substrates together. A variety of substrates may be bonded together using the composition, for instance, plastics, glass, wood, ceramics, metal, coated substrates, such as plastics with an abrasion resistant coating disposed thereon, and the like. The compositions of the invention may be used to bond similar and dissimilar substrates together. The compositions are especially useful for bonding glass or a plastic with an abrasion resistant coating disposed thereon to other substrates such as vehicles and buildings. The compositions of the invention are also useful in bonding parts of modular components together, such as vehicle modular components. The glass or plastic with an abrasion resistant coating disposed thereon can be bonded to coated and uncoated portions of vehicles. The compositions of the invention are especially useful in bonding replacement windows into structures. Advantageously, the adhesive is pumpable, sag resistant and bonds parts together at temperatures between about −10° C. and about 80° C. Preferably, the composition exhibits a sag of an uncured sample of less than about 2 mm. This allows the adhesives prepared from the composition of the invention to be applied at a wide range of ambient temperatures. Heating the material is not necessary for the application of the adhesive. Furthermore, the adhesive demonstrates a combination of high early impact resistance and rapid strength development which facilitates rapid drive away times of preferably one hour, and more preferably 30 minutes, after application of the adhesive at temperatures described above. In particular, windshields installed under such conditions meet United States Federal Motor Vehicle Safety Standard (FMVSS) 212. In some preferred embodiments, the compositions of the invention are nonconductive and demonstrate a resistivity of at least $10^{10}$ Ohm-cm. The compositions of the invention preferably demonstrate a maximum load after 30 minutes of about 0.8 MPa or greater, more preferably about 1.2 MPa or greater and most preferably about 1.6 MPa or greater at 23° C. in a high speed impact test according to the method described hereinafter. Applicability of the composition by hand gun can be assessed with the aid of the press flow viscosity test described hereinafter; according to this test the composition exhibits a press flow viscosity of about 8 grams or greater, more preferably, about 12 grams or greater and most preferably, about 16 grams or greater for 1 minute. The press flow viscosity test uses a Ballan type press flow measurement device, having a nozzle diameter of 4 mm at a pressure of 4 bar.

DETAILED DESCRIPTION OF INVENTION

"One or more" as used herein means that at least one or more than one, of the recited components may be used as disclosed. "Nominal" as used with respect to functionality means the theoretical functionality, generally this can be calculated from the stoichiometry of the ingredients used. Generally, the actual functionality is different due to imperfections in raw material, incomplete conversion of the reactants and formation of bi-products. Polydispersity is expressed as the polydispersity index PDI and means the weight average molecular weight, Mw, divided by the number average molecular weight, Mn. The weight average molecular weight and the number average molecular weight are determined by Gel Permeation Chromatography (also referred to as GPC or SEC). For the purpose of the invention both the Mn and the Mw are determined by evaluating only peaks above Mp=1000. The evaluation of the chromatogram for Mn, Mw and PDI is done by the software of the GPC instruments according to the state of the art. In a preferred embodiment an instrument from Dionex with Chromeleon software can be used, with a double PL gel Mixed D separation column and GPC grade THF as the solvent, allowing separation in the molecular weight range from 1,000-150,000. The column is calibrated with 6 PSty calibration standards in the range between 1000 and 150,000. The use of a RI detector in combination with a viscosity detector from Viscotek with Omnisec software facilitate both standard evaluation and Intrinsic Viscosity corrected evaluation for Mn, Mw and PDI, the latter giving so called universal molecular weights.

The one or more isocyanate functional polyether based prepolymers are present in sufficient quantity to provide adhesive character to the composition. Such prepolymers have an average isocyanate functionality sufficient to allow the preparation of a crosslinked polyurethane upon cure and not so high that the polymers are unstable. "Stability" in this context means that the prepolymer or adhesive prepared from the prepolymer has a shelf life of at least 6 months at ambient temperatures, in that it does not demonstrate an increase in viscosity during such period which prevents its application or use. Preferably, the prepolymer or adhesive prepared therefrom does not undergo an increase in viscosity of more than about 50 percent during the stated period. The prepolymer is prepared by reacting one or more polyisocyanates with one or more compounds containing on average more than one isocyanate reactive group per molecule. The prepolymer preferably has a free isocyanate content which facilitates acceptable strength in adhesives prepared from the prepolymers after 60 minutes and stability of the prepolymer. Preferably, the free isocyanate content is about 1.2 percent by weight or greater based on the weight of the prepolymer and more preferably about 1.4 percent by weight or greater, and most preferably about 1.6 percent by weight or greater, and preferably about 2.2 percent by weight or less, more preferably about 2.0 or less, even more preferably about 1.8 percent by weight or less. Above about 2.2 percent by weight, the adhesives prepared from the prepolymer may demonstrate lap shear strengths after 60 minutes which are too low for the intended use. Below about 1.2 percent by weight, the prepolymer viscosity is too high to handle and the working time is too short. As is well known to the expert in the art, the polydispersity by definition is 1.0 or greater. The prepolymers preferably exhibit a polydispersity of about 2.5 or less, more preferably about 2.3 or less and most preferably about 2.1 or less.

Preferably, the viscosity of the prepolymer is about 200 Pa s or less, and more preferably about 150 Pa s or less, and most preferably about 120 Pa s or less. Preferably, the viscosity of the prepolymer is about 50 Pa s or greater. The viscosity of the adhesive can be adjusted with fillers, although the fillers generally do not improve the green strength of the final adhesive. Below about 50 Pa s the adhesive prepared from the prepolymer may exhibit poor high speed tensile strength. Above about 150 Pa s the prepolymer may be unstable and hard to pump. "Viscosity" as used herein is measured by the Brookfield Viscometer, Model DV-E with a RV spindle #5 at a speed of 5 revolutions per second and at a temperature of 23° C.

Preferably, the polyisocyanates for use in preparing the prepolymer include any aliphatic, cycloaliphatic, araliphatic, heterocyclic or aromatic polyisocyanate, or mixtures thereof. Preferably, the polyisocyanates used have an average isocyanate functionality of at least about 2.0 and an equivalent weight of at least about 80. Preferably, the isocyanate functionality of the polyisocyanate is at least about 2.0, more preferably at least about 2.2, and is most preferably at least about 2.4; and is preferably no greater than about 4.0, more preferably no greater than about 3.5, and most preferably no greater than about 3.0. Higher functionality may also be used, but may cause excessive cross-linking, and result in an adhesive which is too viscous to handle and apply easily, and can cause the cured adhesive to be too brittle. Preferably, the equivalent weight of the polyisocyanate is at least about 80, more preferably at least about 110, and is most preferably at least about 120; and is preferably no greater than about 300, more preferably no greater than about 250, and most preferably no greater than about 200.

Examples of preferable polyisocyanates include those disclosed by Wu, U.S. Pat. No. 6,512,033 at column 3, line 3 to line 49, incorporated herein by reference. More preferred isocyanates are aromatic isocyanates, alicyclic isocyanates and derivatives thereof. Preferably, the aromatic isocyanates have the isocyanate groups bonded directly to aromatic rings. Even more preferred polyisocyanates include diphenylmethane diisocyanate and polymeric derivatives thereof, isophorone diisocyanate, tetramethylxylene diisocyanate, 1,6-hexamethylene diisocyanate and polymeric derivatives thereof, bis(4-isocyanatocylohexyl)methane, and trimethyl hexamethylene diisocyanate. The most preferred isocyanate is diphenylmethane diisocyanate.

The term "isocyanate-reactive compound" as used herein includes any organic compound having nominally at least two isocyanate-reactive moieties. For the purposes of this invention, an active hydrogen containing moiety refers to a moiety containing a hydrogen atom which, because of its position in the molecule, displays significant activity according to the Zerewitinoff test described by Wohler in the *Journal of the American Chemical Society*, Vol. 49, p. 3181 (1927). Illustrative of such active hydrogen moieties are —COOH, —OH, —NH$_2$, —NH—, —CONH$_2$, —SH, and —CONH—. Preferable active hydrogen containing compounds include polyols, polyamines, polymercaptans and polyacids. More preferably, the isocyanate reactive compound is a polyol, and is even more preferably a polyether polyol.

Preferably, polyols useful in the preparation of the prepolymers include those disclosed in Wu, U.S. Pat. No. 6,512,033 at column 4, line 10 to line 64, incorporated herein by reference, and include, for example, polyether polyols, polyester polyols, poly(alkylene carbonate)polyols, hydroxyl containing polythioethers and mixtures thereof. Preferred polyols are polyether polyols containing one or more alkylene oxide units in the backbone of the polyol. Preferred alkylene oxide units are ethylene oxide, propylene oxide, butylene oxide and mixtures thereof. The alkylene oxides can contain straight or branched chain alkylene units. Preferably, the polyol contains propylene oxide units, ethylene oxide units or a mixture thereof. In the embodiment where a mixture of alkylene oxide units is contained in a polyol, the different units can be randomly arranged or can be arranged in blocks of each alkylene oxides. In one preferred embodiment, the polyol comprises propylene oxide chains with ethylene oxide chains capping the polyol. In a preferred embodiment, the polyols are a mixture of diols and triols. Preferably, the isocyanate-reactive compound has a functionality of at least about 1.8, more preferably at least about 1.9, and is most preferably at least about 1.95; and is preferably no greater than about 4.0, more preferably no greater than about 3.5, and is most preferably no greater than about 3.0. Preferably, the equivalent weight of the isocyanate-reactive compound is at least about 200, more preferably at least about 500, and is more preferably at least about 1,000; and is preferably no greater than about 5,000, more preferably no greater than about 3,000, and is most preferably no greater than about 2,500.

The amount of isocyanate containing compound used to prepare the prepolymer is that amount that gives the desired properties, that is, the appropriate free isocyanate content and viscosities as discussed hereinbefore. Preferably, the isocyanates are used to prepare in the prepolymer in an amount of about 1.3 equivalents of isocyanate (NCO) per equivalent of active hydrogen or greater, more preferably about 1.4 equivalents of isocyanate or greater and most preferably about 1.5 equivalents of isocyanate or greater. Preferably, the polyisocyanates used to prepare the prepolymer are used in an amount of about 2.0 equivalents of isocyanate or less, more preferably 1.8 equivalents of isocyanate or less and most preferably about 1.6 equivalents of isocyanate or less.

In one preferred embodiment, the adhesive further comprises a prepolymer containing one or more organic based polymers dispersed therein. Preferably, the organic based polymer is included in the prepolymer by inclusion of a dispersion triol having dispersed therein particles of an organic based polymer. The preferable dispersion triols are disclosed in Zhou, U.S. Pat. No. 6,709,539 at column 4, line 13 to column 6, line 18, incorporated herein by reference. Preferably, the triol used to disperse the organic particles is a polyether triol and more preferably a polyoxyalkylene based triol. Preferably, such polyoxyalkylene oxide triol comprises a polyoxypropylene chain with a polyoxyethylene end cap. Preferably, the triols used have a molecular weight of about 4,000 or greater and more preferably about 5,000 or greater. Preferably, such triol has molecular weight of about 8,000 or less and more preferably about 7,000 or less. Preferably, the particles dispersed in the dispersion triol comprise a thermoplastic polymer, rubber-modified thermoplastic polymer or a polyurea dispersed in a triol. The polyurea preferably comprises the reaction product of a polyamine and a polyisocyanate. Preferably such a dispersion triol based prepolymer is comprised in the adhesive in an amount below about 5 percent by weight.

The prepolymer may be prepared by any suitable method, such as bulk polymerization and solution polymerization. The reaction to prepare the prepolymer is carried out under anhydrous conditions, preferably under an inert atmosphere such as a nitrogen blanket and to prevent crosslinking of the isocyanate groups by atmospheric moisture. The reaction is preferably carried out at a temperature between about 0° C. and about 150° C., more preferably between about 25° C. and about 90° C., until the residual isocyanate content determined by titration of a sample is very close to the desired theoretical value. "Isocyanate content" means the weight percentage of isocyanate moieties to the total weight of the prepolymer. The reactions to prepare the prepolymer may be carried out in the presence of urethane catalysts. Examples of such include the stannous salts of carboxylic acids, such as stannous octoate, stannous oleate, stannous acetate, and stannous laurate. Also, dialkyltin dicarboxylates such as dibutyltin dilaurate and dibutyltin diacetate are known in the art as urethane catalysts, as are tertiary amines and tin mercaptides. Preferably, the reaction to prepare the prepolymer is catalyzed by stannous octoate. The amount of catalyst employed is generally between about 0.005 and about 5 parts by weight of the mixture catalyzed, depending on the nature of the isocyanate. Preferably, the reaction is carried out in admixture with a plasticizer. The following procedures are used to prepare a prepolymer having the desired polydispersity. Preferably a polyether diol, having an effective functionality of at least 1.9, preferably at least 1.95 and a polyether triol, having an effective functionality of at least 2.8, preferably at least 2.9 are reacted with an aromatic polyisocyanate with a functionality of at least 2.0. The polyether polyols may contain up to 30 percent of ethylene oxide units. Preferred polyether diols have a molecular weight of about 1,000 to about 6,000 and preferred polyether triols have a molecular weight of about 3,000 to about 9,000 as calculated from the OH-number. Other less preferred isocyanate functional prepolymers, having PDIs in excess of 2.5 may be added in such an amount that the average polydispersity index PDI (Mw/Mn) of the prepolymer mixture is 2.5 or less. It is possible to calculate the PDI of polymer mixtures from the Mn and Mw data of the individual component (pre)polymers as is well known to the expert in the art. The following formula gives the relationship:

$$PDI_{(prepolymer\ mixture)} = \frac{\sum w_i * Mw_i}{\sum x_i * Mn_i}$$

Xi=mole fraction, wi=weight fraction of all prepolymers in an adhesive mixture.

The prepolymer is present in the composition of the invention in a sufficient amount such that the adhesive is capable of bonding substrates together. Preferably, the polyurethane prepolymer is present in an amount of about 10 percent by weight or greater based on the weight of the composition, more preferably about 30 percent by weight or greater and most preferably about 50 percent by weight or greater. Preferably, the polyurethane prepolymer is present in an amount of about 65 percent by weight or less based on the weight of the composition, more preferably about 60 percent by weight or less and most preferably about 55 percent by weight or less.

The polyurethane prepolymers useful in the invention may further comprise a plasticizer. The plasticizers useful in the prepolymer are common plasticizers useful in polyurethane adhesive applications and well known to those skilled in the art and are referred hereinafter as low polar plasticizers. The plasticizers are present in an amount sufficient to disperse the prepolymer in the final adhesive composition. The plasticizers can be added to the adhesive either during preparation of the prepolymer or during compounding of the adhesive composition. Preferably, the plasticizers are present in about 0 percent by weight or greater of the prepolymer formulation (prepolymer plus plasticizer), more preferably about 1 percent by weight or greater and most preferably about 6 percent by weight or greater. Preferably, the plasticizer is present in about 15 percent by weight or less of the prepolymer formulation and more preferably about 13 percent by weight or less.

The composition of the invention comprises components to control the rheology, viscosity, pumpability and the sag characteristics of the composition. The materials included in the composition for these purposes include one or more fillers, one or more isocyanate functional polyester based prepolymers or a mixture thereof. These materials are added in a sufficient amount such that the composition exhibits the desired rheology, viscosity and the sag characteristics. Preferably these components are added in such that the composition exhibits a press flow viscosity of about 8 grams per minute or higher, more preferably about 12 grams per minute or higher and most preferably about 16 grams per minute or higher to allow for application with a manual dispensing gun. In a preferred embodiment, a mixture of one or more fillers and one or more isocyanate functional polyester based prepolymers are used in the composition.

The composition comprises one or more fillers. Fillers are added for a variety of reasons as described hereinbefore and one or more types of fillers may be utilized in the composition of this invention. Fillers may be added to reinforce the composition, to impart the appropriate viscosity and rheology and to strike a balance between cost and the desired properties of the composition and the parts of the composition. Preferred classes of fillers comprise one or more carbon blacks, one or more clays, one or more non-pigmented fillers, one or more thixotropes or combinations thereof. In a preferred embodiment, the fillers comprise one of more carbon blacks and one or more clays.

One preferred group of fillers useful in the invention are fillers that impart a balance of cost and viscosity to each part. Such fillers are preferably non-pigmented fillers and are used in a sufficient amount to impart an acceptable balance of viscosity and cost to the formulation and to achieve the desired properties of the composition. Among fillers useful for this purpose are talc, calcium carbonates, and kaolin. Preferred non pigmented fillers include calcium carbonate or kaolin. Calcium carbonates useful in this invention are standard calcium carbonates. Such standard calcium carbonates are untreated, that is, they are not modified by treatment with other chemicals, such as organic acids or esters of organic acids. Kaolin is also known as Kaolinite and comprises compounds represented by the chemical formula $Al_2Si_2O_5(OH)_4$, and it most often occurs as clay-sized, platelike, hexagonally shaped crystals. Preferably, the non-pigmented filler is present in an amount sufficient to render the rheology of the composition suitable to function as an adhesive applicable by hand-gun. Preferably, the non pigmented filler is present in an amount of about 0 percent by weight or greater, even more preferably about 3 percent by weight and most preferably about 5 percent by weight or greater. Preferably, the non pigmented filler is present in an amount of about 32 percent by weight or less and most preferably about 25 percent by weight or less. Where calcium carbonate is the nonpigmented filler, the calcium carbonate is preferably uncoated. Calcium carbonates are preferably present in an amount of about 0 percent by weight or greater of the composition of the invention, more preferably about 15 percent by weight or greater and more preferably about 20 percent by weight or greater. Preferably, the calcium carbonates are used in the amount of about 35 percent by weight or less of the composition of the invention and more preferably about 28 percent by weight or less.

The composition of this invention may further comprise a reinforcing filler which is present to improve the strength and rheology of the composition. The preferred class of reinforcing fillers comprises one or more forms of carbon black. The reinforcing filler is present in a sufficient amount to reinforce the composition and to improve the rheology of the composition. In automotive applications, nonconductivity is generally understood to mean an impedance of the composition of at least $10^{10}$ Ohm-cm. Preferably, the reinforcing filler is present in an amount such that the parts of the composition are nonconductive. If too much of certain reinforcing fillers, such as one or more forms of carbon black are present, the composition may be conductive. When carbon black is used as the reinforcing filler, the carbon black used may be a standard carbon black. Standard carbon black is carbon black which is not specifically surface treated or oxidized to render it nonconductive. One or more nonconductive carbon blacks may be used in conjunction with the standard carbon black, although such inclusion may add unnecessary costs. The amount of standard carbon black in the composition is that amount which provides the desired color, viscosity, sag resistance and strength. If nonconductivity of the composition is desired, standard carbon black may be utilized at a level at which the composition is nonconductive. The reinforcing filler, such as one or more forms of carbon black, is preferably present in the composition, based on the weight of the composition, in an amount by about 0 percent by weight or greater, more preferably by about 10 percent by weight or greater and most preferably about 14 percent by weight or greater. The reinforcing filler, such as one or more forms of carbon black, is preferably present the composition, based on the weight of the composition, in an amount of about 20 percent by weight or less, more preferably about 18 percent by weight or less, and most preferably about 16 percent by weight or less. If conductive carbon black is used, attention must be paid to keep the concentration below about 18 percent by weight in the overall composition to prevent the impedance of the composition to be above $10^{10}$ Ohm-cm, compositions below this amount are considered to be nonconductive. Standard carbon blacks are well known in the art and include RAVEN™ 790, RAVEN™ 450, RAVEN™ 500, RAVEN™ 430, RAVEN™ 420 and RAVEN™ 410 carbon blacks available from Colombian and CSX™ carbon blacks available from Cabot, and PRINTEX™30 carbon black available from Degussa. Nonconductive carbon blacks are well known in the art and include RAVEN™ 1040 and RAVEN™ 1060 carbon black available from Colombian.

Another class of filler useful in the composition is clays which are added for the purpose of improving the cost effectiveness, viscosity and nonconductive nature of the compositions of the invention. Preferred clays useful in the invention include kaolin, surface treated kaolin, calcined kaolin, aluminum silicates and surface treated anhydrous aluminum silicates. The clays can be used in any form which facilitates formulation of a hand-dispensable adhesive. Preferably, the clay is admixed in the form of pulverized powder, spray-dried beads or finely ground particles. Clays may be used in an amount of about 0 percent by weight or greater of the composition of the invention, more preferably about 10 percent by weight or greater and even more preferably about 16 percent by weight or greater. Preferably, the clays are used in an amount of about 30 percent by weight or less of the composition of the invention and more preferably about 23 percent by weight or less.

The adhesive composition may further comprise a filler which functions as a thixotrope (rheological additive). Such thixotropes are well known to those skilled in the art and include fumed silica and the like. Preferred fumed silicas include organically modified fumed silicas. The thixotrope may be added to the composition in a sufficient amount to give the desired rheological properties. Preferably, the thixotrope is present in an amount of about 0 percent by weight or greater based on the weight of the composition of the invention, preferably about 0.5 percent by weight or greater. Preferably, the optional thixotrope is present in an amount of about 3 percent by weight or less based on the weight of the composition of the invention and more preferably about 2 percent by weight or less.

The composition may further comprise one or more isocyanate functional prepolymers containing one or more polyester based polyols which are solid at ambient temperature, about 23° C. The polyester based polyols have melting points such that the prepolymer provides sufficient green strength to prevent the substrates from moving in relation to one another due to gravitational forces at ambient temperatures. In terms of installing a window in a vehicle or building, the polyester based prepolymer prevents the window from sliding after installation. Preferably, the polyester polyols have melting points of about 40° C. or greater, even more preferably about 45° C. or greater and most preferably about 50° C. or greater. Preferably, the polyester polyols exhibit melting points of about 85° C. or less, even more preferably about 70° C. or less and most preferably about 60° C. or less. The polyester based isocyanate prepolymer can be prepared using one or more polyester polyols and preferably an aromatic polyisocyanate. In order to facilitate pumpability, it may be diluted with a plasticizer. The amount of polyester polyol in the prepolymer is a sufficient amount to support pumpability of the composition of the invention. Preferably, the polyester polyol is present in the polyester polyol based isocyanate prepolymer in an amount of about 70 percent by weight or greater based on the weight of the prepolymer and more preferably about 80 percent by weight or greater. Preferably, the polyester polyol is present in the polyester polyol based isocyanate prepolymer in an amount of about 95 percent by weight or less based on the weight of the prepolymer and more preferably about 90 percent by weight or less. Preferably, the polyester polyol based isocyanate prepolymer is present in the adhesive composition in sufficient amount to support the needed green strength and the desired rheology of the composition. If the amount is too high, the adhesive composition is not hand gun applicable at ambient temperature. Preferably, the polyester polyol based isocyanate prepolymer is present in the adhesive composition in an amount of about 0 percent by weight or greater based on the weight of the adhesive composition, more preferably about 1 percent by weight or greater and most preferably about 2 percent by weight or greater. Preferably, the polyester polyol based isocyanate prepolymer is present in the adhesive composition in an amount of about 10 percent by weight or less, even more preferably about 5 percent by weight or less and most preferably about 3 percent by weight or less. The polyester polyol can be any polyester composition that meets the property requirements defined, which is crystalline at ambient temperatures and melts in the desired temperature range. Preferred polyester polyols are prepared from linear diacids and linear diols. A more preferred diacid is adipic acid. More preferred diols are the $C_{2-6}$ diols, with butane diols, pentane diols and hexane diols being most preferred. The polyester based polyisocyanate prepolymers can be prepared using the processes and isocyanates described hereinbefore. Preferred polyester polyols are available from Creanova under the trade name DYNACOL and the designations 7381, 7360 and 7330, with 7381, most preferred.

The composition of the invention may further comprise a polyfunctional isocyanate for the purpose of improving the modulus of the composition in the cured form. "Polyfunctional" as used in the context of the isocyanates refers to isocyanates having a functionality of 3 or greater. The polyisocyanates can be any monomeric, oligomeric or polymeric isocyanate having a nominal functionality of about 3 or greater. More preferably, the polyfunctional isocyanate has a nominal functionality of about 3.2 or greater. Preferably, the polyfunctional isocyanate has a nominal functionality of about 5 or less, even more preferably about 4.5 or less and most preferably about 4.2 or less. The polyfunctional isocyanate can be any isocyanate which is reactive with the isocyanate polyisocyanate prepolymers used in the composition and which improves the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300, DESMODUR N-100, and polymeric isocyanates such as polymeric MDI (methylene diphenyl diisocyanates) such as those marketed by The Dow Chemical Company under the trademark of PAPI, including PAPI 20 polymeric isocyanate. The polyfunctional isocyanates are present in a sufficient amount to impact the modulus of the cured compositions of the invention. If too much is used, the cure rate of the composition is unacceptably slowed down. If too little is used, the desired modulus levels are not achievable. The polyfunctional isocyanate is preferably present in an amount of about 0.5 percent by weight or greater based on the weight of the adhesive composition, more preferably about 1.0 percent by weight or greater and most preferably about 1.4 percent by weight or greater. The polyfunctional isocyanate is preferably present in an amount of about 8 percent by weight or less, based on the weight of the adhesive composition, more preferably about 5 percent by weight or less and most preferably about 3 percent by weight or less.

The adhesive also contains a catalyst which catalyzes the reaction of isocyanate moieties with water or an active hydrogen containing compound. Such compounds are well known in the art. The catalyst can be any catalyst known to the skilled artisan for the reaction of isocyanate moieties with water or active hydrogen containing compounds. Among preferred catalysts are organotin compounds, metal alkanoates, and tertiary amines. Mixtures of classes of catalysts may be used. A mixture of a tertiary amine and a metal salt is preferred. Even more preferred are tertiary amines, such as dimorpholino diethyl ether, and a metal alkanoate, such as bismuth octoate. Included in the useful catalysts are organotin compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. Dialkyl tin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. The organo tin or metal alkanoate catalyst is present in an amount of about 60 parts per million or greater based on the weight of the adhesive, more preferably 120 parts by million or greater. The organo tin or metal alkanoates catalyst is present in an amount of about 1.0 percent or less based on the weight of the adhesive, more preferably 0.5 percent by weight or less and most preferably 0.1 percent by weight or less.

Useful tertiary amine catalysts include dimorpholinodialkyl ether, a di((dialkylmorpholino)alkyl)ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine and mixtures thereof. A preferred dimorpholinodialkyl ether is dimorpholinodiethyl ether. A preferred di((dialkylmorpholino)alkyl) ether is (di-(2-(3,5-dimethylmorpholino)ethyl)-ether). Tertiary amines are preferably employed in an amount, based on the weight of the adhesive of about 0.01 percent by weight or greater, more preferably about 0.05 percent by weight or greater, even more preferably about 0.1 percent by weight or greater and most preferably about 0.2 percent by weight or greater and about 2.0 percent by weight or less, more preferably about 1.75 percent by weight or less, even more preferably about 1.0 percent by weight or less and most preferably about 0.4 percent by weight or less.

The composition of the invention also preferably contains one or more plasticizers or solvents to modify rheological properties to a desired consistency. Such materials should be free of water, inert to isocyanate groups and compatible with the prepolymer. Such material may be added to the reaction mixtures for preparing the prepolymer, or to the mixture for preparing the final adhesive composition, but is preferably added to the reaction mixtures for preparing the prepolymer and the adduct, so that such mixtures may be more easily mixed and handled. Suitable plasticizers and solvents are well known in the art and include straight and branched alkylphthalates, such as diisononyl phthalate, dioctyl phthalate and dibutyl phthalate, a partially hydrogenated terpene commercially available as "HB-40", trioctyl phosphate, alkylsulfonic acid esters of phenol (Mesamoll, Bayer), toluene-sulfamide, adipic acid esters, castor oil, xylene, 1-methyl-2-pyrrolidinone and toluene. The amount of plasticizer used is that amount sufficient to give the desired rheological properties and disperse the components in the composition of the invention. Preferably, the plasticizer is present in the composition of the invention in an amount of about 0 percent by weight or greater, more preferably about 1 percent by weight or greater and most preferably about 6 percent by weight or greater. The plasticizer is present in an amount of about 15 percent by weight or less and more preferably about 13 percent by weight or less.

The composition of this invention may further comprise stabilizers, which function to protect the adhesive composition from moisture, thereby inhibiting advancement and preventing premature crosslinking of the isocyanates in the adhesive formulation. Stabilizers known to the skilled artisan for moisture curing adhesives may be used preferably herein. Included among such stabilizers are diethylmalonate, paratoluene sulfonic isocyanates, benzoyl chloride and orthoalkyl formates. Such stabilizers are preferably used in an amount of about 0.1 percent by weight or greater based on the total weight of the adhesive composition, preferably about 0.5 percent by weight or greater and more preferably about 0.8 percent by weight or greater. Such stabilizers are used in an amount of about 5.0 percent by weight or less based on the weight of the adhesive composition, more preferably about 2.0 percent by weight or less and most preferably about 1.4 percent by weight or less.

The composition of this invention may further comprise an adhesion promoter, such as those disclosed in Mahdi, U.S. Patent Publication 2002/0100550 paragraphs 0055 to 0065 and Hsieh, U.S. Pat. No. 6,015,475 column 5, line 27 to column 6, line 41, incorporated herein by reference. The amounts of such adhesion promoters useful are also disclosed in these references and incorporated herein by reference.

The composition may further comprise a hydrophilic material that functions to draw atmospheric moisture into the composition. This material enhances the cure speed of the formulation by drawing atmospheric moisture to the composition. Preferably, the hydrophilic material is a liquid. Among preferred hydrophilic (hydroscopic) materials are pyrrolidinones such as 1 methyl-2-pyrrolidinone, available from under the trademark M-Pyrol. The hydrophilic material is preferably present in an amount of about 0.1 percent by weight or greater and more preferably about 0.3 percent by weight or greater and preferably about 1.0 percent by weight or less and most preferably about 0.6 percent by weight or less.

Other components commonly used in adhesive compositions may be used in the composition of this invention. Such materials are well known to those skilled in the art and may include ultraviolet stabilizers and antioxidants and the like.

The adhesive composition of this invention may be formulated by blending the components together using means well known in the art. Generally, the components are blended in a suitable mixer. Such blending is preferably conducted in an inert atmosphere in the absence of oxygen and atmospheric moisture to prevent premature reaction. In embodiments where a polyester based isocyanate functional prepolymer is used, the adhesive compositions are blended at a temperature above the melting point of the polyester based isocyanate functional prepolymer and below a temperature at which significant side reactions occur. In this embodiment, the temperatures utilized are from about 40° C. to less than about 90° C., and more preferably about 50° C. to about 70° C. It may be advantageous to add any plasticizers to the reaction mixture for preparing the isocyanate containing prepolymer so that such mixture may be easily mixed and handled. Alternatively, the plasticizers can be added during blending of all the components. Once the adhesive composition is formulated, it is packaged in a suitable container such that it is protected from atmospheric moisture and oxygen. Contact with atmospheric moisture and oxygen could result in premature crosslinking of the polyurethane prepolymer-containing isocyanate groups.

The adhesive composition of the invention is used to bond a variety of substrates together as described hereinbefore. The composition can be used to bond porous and nonporous substrates together. The adhesive composition is applied to a substrate and the adhesive on the first substrate is thereafter contacted with a second substrate. In preferred embodiments, the surfaces to which the adhesive is applied are cleaned and primed prior to application, see for example, U.S. Pat. Nos.

4,525,511; 3,707,521 and 3,779,794; relevant parts of all are incorporated herein by reference. Generally, the adhesives of the invention are applied at ambient temperature in the presence of atmospheric moisture. Exposure to atmospheric moisture is sufficient to result in curing of the adhesive. Curing can be accelerated by the addition of additional water or by applying heat to the curing adhesive by means of convection heat, microwave heating and the like. Preferably, the adhesive of the invention is formulated to provide a working time of about 6 minutes or greater and more preferably about 10 minutes or greater. Preferably, the working time is about 15 minutes or less and more preferably about 12 minutes or less.

The adhesive composition is preferably used to bond glass or plastic coated with an abrasion resistant coating, to other substrates such as metal or plastics. In a preferred embodiment, the first substrate is a glass, or plastic coated with an abrasion resistant coating, window and the second substrate is a window frame. In another preferred embodiment, the first substrate is a glass, or plastic coated with an abrasion resistant coating, window and the second substrate is a window frame of an automobile. Preferably, the glass window is cleaned and has a glass primer applied to the area to which the adhesive is to be bonded. The plastic coated with an abrasion resistant coating can be any plastic which is clear, such as polycarbonate, acrylics, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or plastic window has an opaque coating disposed in the region to be contacted with the adhesive to block UV light from reaching the adhesive.

In a preferred embodiment, the composition of the invention is used to replace windows in structures or vehicles and most preferably in vehicles. The first step is removal of the previous window. This can be achieved by cutting the bead of the adhesive holding the old window in place and then removing the old window. Thereafter, the new window is cleaned and if needed primed. The old adhesive that is located on the window flange can be removed, although it is not necessary and in most cases it is left in place, but may be cut flat with a cutting tool. The window flange is preferably primed with a paint primer. The adhesive is applied in a bead to the periphery of the window located such that it will contact the window flange when placed in the vehicle. The window with the adhesive located thereon is then placed into the flange with the adhesive located between the window and the flange. Alternatively, the adhesive may be applied to the window flange. The adhesive bead is a continuous bead that functions to seal the junction between the window and the window flange. A continuous bead of adhesive is a bead that is located such that the bead connects at each end to form a continuous seal between the window and the flange when contacted. Thereafter the adhesive is allowed to cure. The composition of the invention is also useful for bonding large mass substrates of more than 20 Kg, up to about 120 Kg, to the substrates. In one class of large mass substrates, the composition of the invention are large windows such as those utilized in mass transportation vehicles.

In certain applications, the polymerizable composition of the invention may be utilized with a primer or an activation wipe. The primer or activation wipe is typically applied to the surface of one or more of the substrates. Any solvent is allowed to volatilize away and then the polymerizable composition is contacted with the substrates. Preferably, the time period from application of the primer or activation wipe to application of the polymerizable composition to the substrate is about 0.5 minutes or greater, more preferably about 1 minute or greater and most preferably about 2 minutes or greater.

In another embodiment, the compositions of the invention can be used to bond modular components together. Examples of modular components include vehicle modules, such as door, window or sun-roof.

"Viscosities" as described herein are determined according to the procedure disclosed in Bhat, U.S. Pat. No. 5,922,809 at column 12, lines 38 to 49, incorporated herein by reference. "Molecular weights" as described herein are determined according to the method described hereinbefore, section [008].

Illustrative Embodiments of the Invention

The following examples are provided to illustrate the invention, but are not intended to limit the scope thereof. All parts and percentages are by weight unless otherwise indicated.

Ingredients:

| Ingredient | Tradename | Vendor | Specifications |
|---|---|---|---|
| Polyoxypropylene Diol 1 | DESMOPHEN 2061BD | Bayer | hydroxyl number 56. |
| Polyoxypropylene Triol 1 | ACCLAIM 6300 | Bayer | hydroxyl number 28; |
| Polyoxypropylene Diol 2 | VORANOL 2000L | Dow | hydroxyl number ~55.5. |
| Polyoxypropylene Triol 2 | VORANOL 4610 | Bayer | hydroxyl number ~35. |
| Polyoxypropylene Triol 3 SAN grafted | SPECFLEX NC 700 | Dow | hydroxyl number ~21 |
| Polyester diol 1 | DYNACOLL 7381 | Degussa | hydroxyl number ~30; |
| Diphenylmethane 4,4' diisocyanate | ISONATE M 125 | Dow | |
| Polyfunctional polyisocyanate | DESMODUR N3300 | Bayer | Functionality 3 |
| Carbon Black | PRINTEX 30 | Degussa | |
| Clay | POLESTAR 200R | Imerys | |
| Plasticizer | VESTINOL 9 | Oxeno Olefin Chemie | |

Prepolymer Preparation

Prepolymer 1 is prepared by mixing 60.000 g of polyoxypropylene diol 1 with 15.000 g of polyoxypropylene triol 1. 10.983 g of plasticizer and 13.000 g of diphenylmethane 4,4' diisocyanate are added. Then 0.001 g of orthophosphoric acid in 0.009 g of methyl ethyl ketone and 1.000 g of diethylemalonate are added. The reaction mixture is heated to 50° C. in a reactor and 0.007 g of stannous octoate are added. The reaction is carried out for 1 hour at 50° C.

Prepolymer 2 is prepared by mixing 22.799 g of polyoxypropylene diol 2 with 33.476 g of polyoxypropylene triol 2. 34.120 g of plasticizer and 9.597 g of diphenylmethane 4,4' diisocyanate are added. Then 0.001 g of orthophosphoric acid in 0.009 g of methyl ethyl ketone and 1.000 g of diethylmalonate are added. The reaction mixture is heated to 50° C. in a reactor and 0.007 g of stannous octoate are added. The reaction is carried out for 1 hour at 50° C.

Prepolymer 3 is prepared by adding 60.580 g of SAN (styrene acrylonitrile) grafted polyoxypropylene triol 3, 31.980 g of plasticizer and 7.4100 g of diphenylmethane 4,4' diisocyanate to a reactor. Then 0.001 g or orthophosphoric acid in 0.009 g of methyl ethyl ketone. The reaction mixture is heated to 50° C. and 0.020 g of stannous octoate are added. The reaction is carried out for 1 hour at 50° C.

Polyester Prepolymer 4 is prepared by adding 71.70 g of polyester diol 1, 17.50 g of plasticizer and 10.80 g of diphenylmethane 4,4' diisocyanate to a reactor. The reaction mixture is heated to 50° C. in a reactor and 0.007 g of stannous octoate are added. The reaction is carried out for 1 hour at 50° C.

Adhesive Preparation

The adhesive compositions are prepared by placing components 1 and 2 into a planetary mixer and degassed for 30 minutes. Then components 3 and 4 are added in designated amounts. The mixture is mixed for 30 minutes under vacuum. Then components 5 to 7 are added and the mixture is mixed for 15 minutes. The components, component numbers and the amounts are provided in the following table.

The impact resistance tests are carried out on an impact pendulum tester from TMI, type 43-01 at an impact speed of 4 m/s. The high speed impact resistance and maximum strength are tested according to the following method. The adhesive is applied between the prongs of the sample preparation holder so that it overflows onto tape. Afterwards coupons (76×25×5 mm) are placed on top of the prongs and the excess adhesive is removed slowly with a spatula to ensure that the bead is of perfect shape (25×13×5 mm). After that the test specimens are stored for the desired cure time and environmental conditions. Then, the impact pendulum was brought up and latched, the test specimen fixed in position and the hammer released. For each test the following is measured.

The ingredients and amounts used in the tested adhesives are listed in the following Table. The total weight of the ingredients listed for all examples is 100 g.

| | Ingredient | Adhesive 1 | Adhesive 2 | Adhesive 3 |
|---|---|---|---|---|
| 1 | Prepolymer 1 (g) | 52.9 | | |
| | Polydispersity Index PDI | 1.7 | | |
| 1 | Prepolymer 2 (g) | | 47.90 | 27 |
| | Polydispersity Index PDI | | 2.6 | 2.6 |
| 1 | Prepolymer 3 (g) | | 13 | 13 |
| | Polydispersity Index PDI | | 11 | 11 |
| 1 | Polyester Prepolymer 4 (g) | 3 | 3 | 3 |
| | Polydispersity Index PDI | 2.2 | 2.2 | 2.2 |
| | PDI of prepolymer mixture * | 2.0 | 4.6 | 5.5 |
| 2 | Polyfunctional polyisocyanate (g) | 0.5 | | 1.6 |
| 2 | Diphenylmethane 4,4' diisocyanate (g) | | 0.5 | |
| 3 | Carbon black (g) | 14 | 16 | 13 |
| 4 | Clay (g) | 21 | 19 | 27.8 |
| 5 | Plasticizer (g) | 6 | | 12 |
| 6 | Diethylmalonate (g) | 2 | | 2 |
| 7 | Dimorpholinodiethyl ether (g) | 0.6 | 0.6 | 0.6 |
| | Plasticizer content (%) | 12.5 | 20.9 | 26.5 |
| | Impact resistance after 30 min at 23° C./50% RH (J) | 2.9 | 2.1 | 1.5 |
| | High Speed Impact Maximum load after 30 min at 23° C./50% RH (MPa) | 1.6 | 0.8 | 0.21 |

$$*PDI_{(prepolymer\ mixture)} = \frac{\sum\limits_{w_i} * Mw_i}{\sum\limits_{X_i} * Mn_i}$$

Xi = mole fraction, wi = weight fraction of all prepolymers in an adhesive mixture.

What is claimed is:

1. A composition comprising:
   a) one or more isocyanate functional polyether based prepolymers having an average polydispersity index of equal or less than about 2.5 determined by GPC at a Mp of >1,000;
   b) less than 15 percent by weight of one or more plasticizers;
   c) one or more catalysts for the reaction of isocyanate moieties with isocyanate reactive groups;
   d) one or more fillers, in a sufficient amount such that the composition exhibits a press flow viscosity of about 8 grams per minute or more;
   wherein the composition demonstrates 30 minutes after application a peak strength of 1.6 MPa or greater according to DIN EN 1465 and an energy uptake of about 2.5 J or greater in a high speed impact test at 4 m/s.

2. A composition according to claim 1 wherein the one or more plasticizers are present in an amount of about 7 to about 13 percent by weight based on the weight of the composition.

3. A composition according to claim 1 wherein the filler comprises one or more carbon blacks, one or more non-pigmented fillers, one or more thixotropes or a combination thereof.

4. A composition according to claim 3 wherein the one or more fillers comprise nonconductive and/or conductive carbon black in such an amount that the composition is non-conductive.

5. A composition according to claim 4 wherein the one or more conductive carbon blacks is present in an amount of about 10 percent by weight to about 18 percent by weight based on the weight of the composition.

6. A composition according to claim 1 wherein the one or more fillers comprise one or more clays.

7. A composition according to claim 6 wherein the one or more clay fillers are present in an amount of about 10 percent by weight to about 30 percent by weight based on the weight of the composition.

8. A composition according to claim 1 wherein the one or more fillers comprise one or more carbon blacks and one or more clays.

9. A composition according to claim 8 wherein the composition further comprises one or more isocyanate functional polyester based prepolymers which are solid at 23° C.

10. A composition according to claim 9 wherein the one or more isocyanate functional polyester based prepolymers are present in an amount of about 1 percent by weight to about 4 percent by weight based on the weight of the composition.

11. A composition according to claim 1 wherein the one or more fillers further comprise one or more nonpigmented fillers.

12. A composition according to claim 11 wherein the one or more nonpigmented fillers are present in an amount of about 3 percent by weight to about 15 percent by weight based on the weight of the composition.

13. A composition according to claim 1 wherein the one or more fillers further comprise one or more thixotropes.

14. A composition according to claim 13 wherein the one or more thixotropes are present in an amount of about 0.1 percent by weight to about 3 percent by weight based on the weight of the composition.

15. A composition according to claim 1 wherein the catalyst comprises one or more organometallic compounds, one or more amines or a mixture thereof.

16. A composition according to claim 1 which further comprises a polyisocyanate.

17. A method of bonding two or more substrates together which comprises contacting the two or more substrates together with a composition according to claim 1 disposed along at least a portion of the area wherein the substrates are in contact.

18. The method of claim 17 wherein at leat one of the substrates is window glass.

19. The method of claim 18 wherein at least one of the other substrates is a building or a vehicle.

20. A method of replacing a window of a vehicle comprising:
  i) removing the window from the vehicle;
  ii) applying a composition according to claim 1 to a replacement window or to the flange of the vehicle adapted to hold the window into the vehicle;
  iii) contacting the flange of the vehicle and the replacement window with the composition disposed between the replacement window and the flange of the vehicle; and
  iv) allowing the adhesive to cure.

\* \* \* \* \*